Aug. 30, 1938.   A. R. SQUYER   2,128,543
HEADLIGHT TESTER
Filed May 25, 1936   3 Sheets-Sheet 1
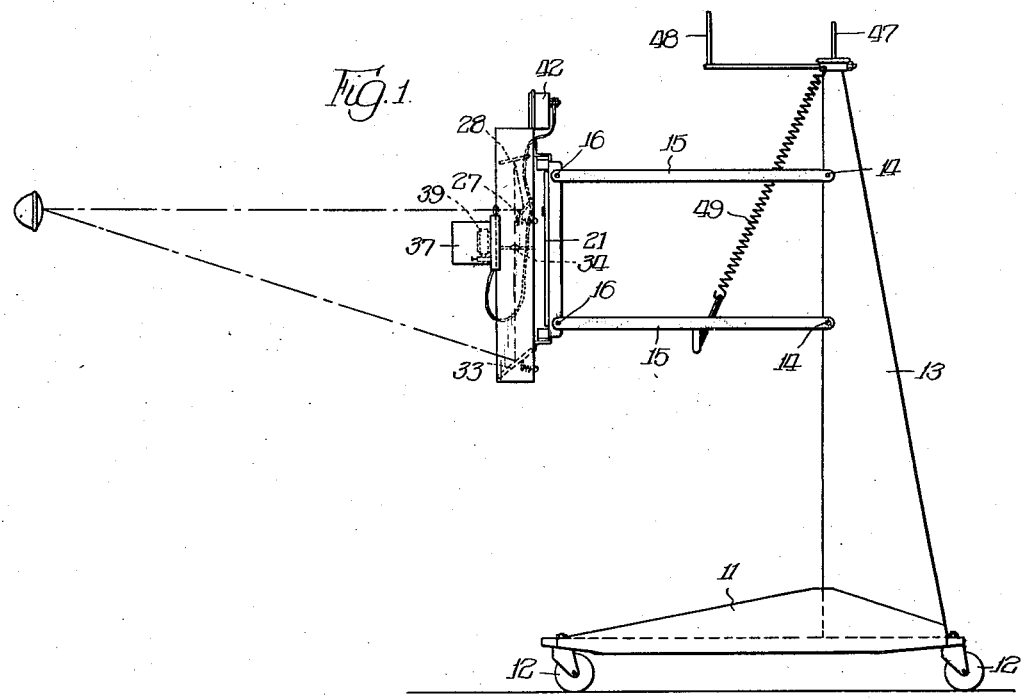
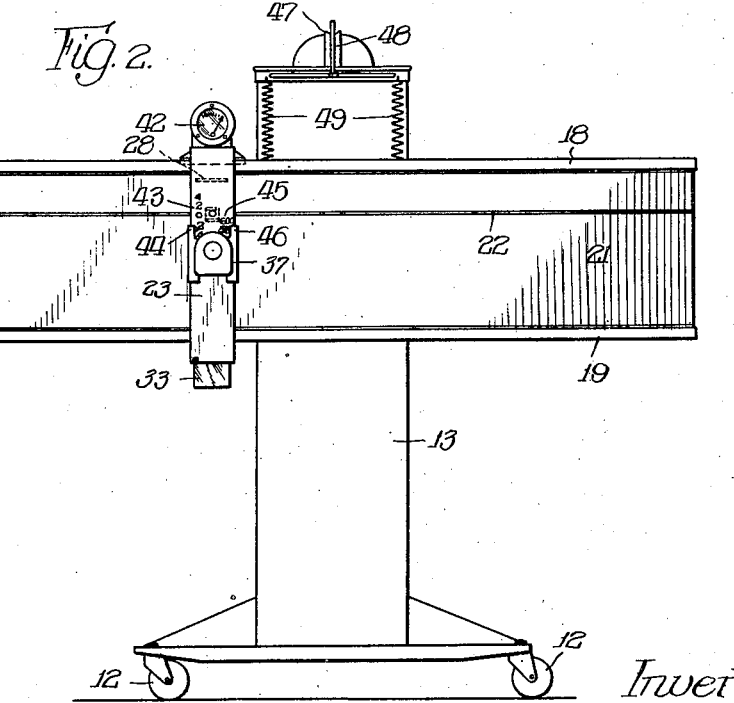

Aug. 30, 1938.   A. R. SQUYER   2,128,543
HEADLIGHT TESTER
Filed May 25, 1936   3 Sheets-Sheet 2
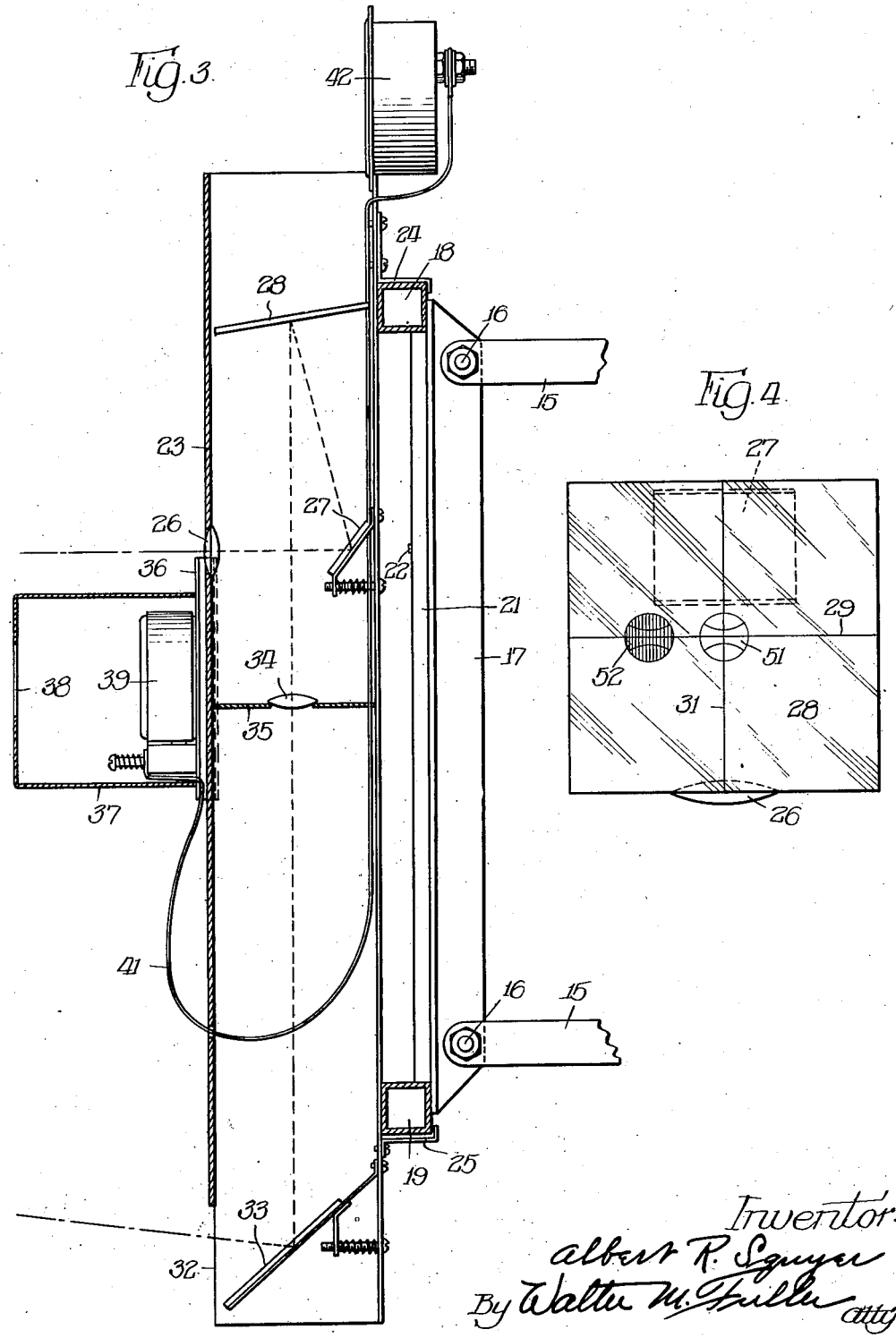

Aug. 30, 1938. A. R. SQUYER 2,128,543
HEADLIGHT TESTER
Filed May 25, 1936 3 Sheets-Sheet 3
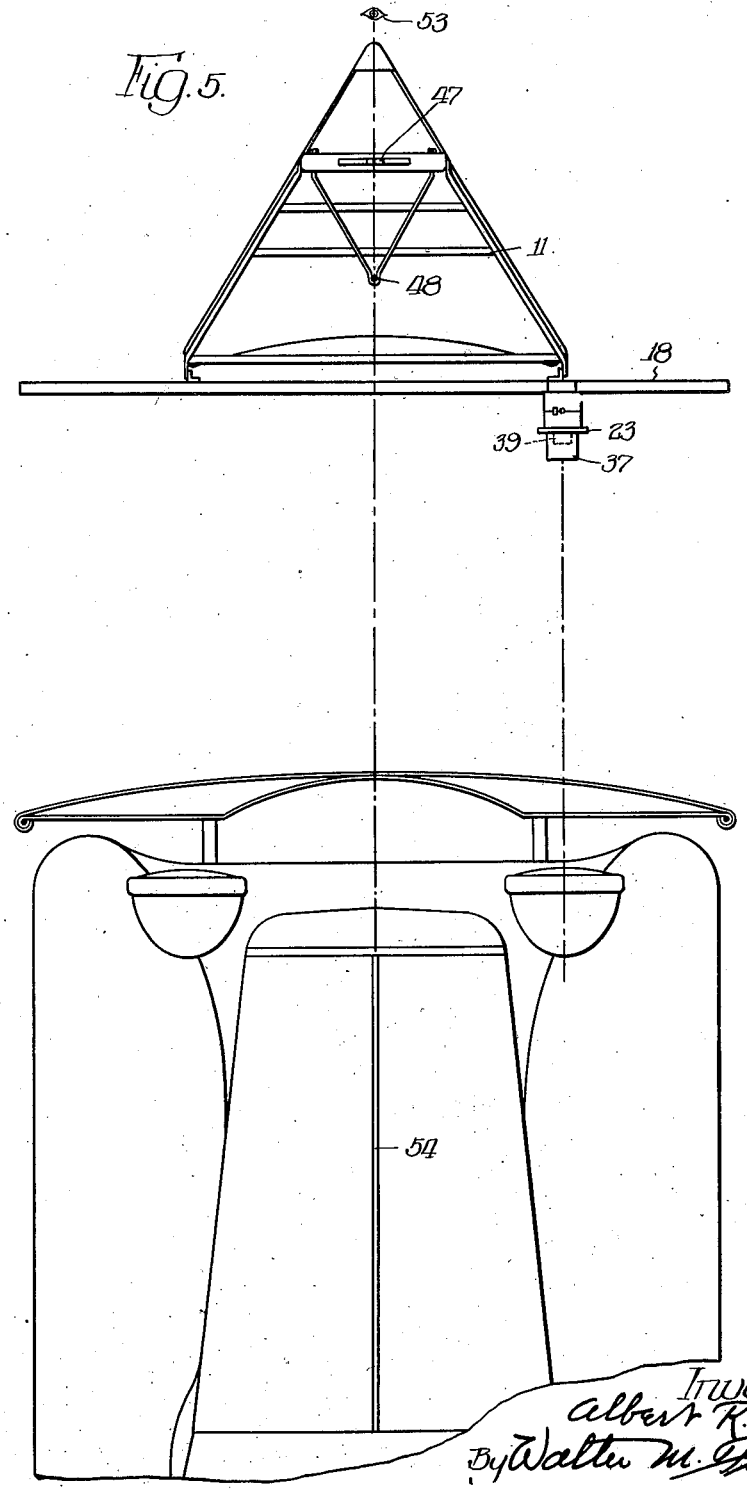

Patented Aug. 30, 1938

2,128,543

UNITED STATES PATENT OFFICE 2,128,543

HEADLIGHT TESTER

Albert R. Squyer, Springfield, Ill., assignor to Weaver Manufacturing Company, Springfield, Ill., a corporation of Illinois Application May 25, 1936, Serial No. 81,617

18 Claims. (Cl. 88—14)

The present invention relates to certain novel features of betterment in appliances for testing the headlights of automobiles, one of the leading objects of the invention being the provision of relatively simple and comparatively inexpensive means to verify the brightness and direction of the light rays or beams emanating from the headlights, whereby to determine whether replacement of bulbs is needed, polishing of reflectors is required, or the positions of the lamps should be adjusted for correct direction of the beams of light.

The improved headlight-tester readily locates the exact center or brightest spot of the beam, commonly known as the "hot spot", and it not only measures the candle-power of the illumination provided, but it also shows the inclination or drop of the beam, preferably, but not necessarily restrictedly, in inches per twenty-five feet.

In addition, the daylight screen of the apparatus gives a visual picture to the driver of the automobile of the exact condition of his headlights and the pattern of the beam or beams from each headlight individually.

Increased illumination resulting from polishing of the head-light reflectors and cleaning of the lenses shows immediately in the augmented candle-power registered on the gauge associated with a photoelectric-cell forming part of the appliance.

Replacement of weak or worn-out lamp-bulbs with new ones indicates precisely how much better the new bulbs are than the old ones which have been removed.

Some of the outstanding advantages of the new and improved structure may be enumerated as follows: It measures the light-beam intensity in candle-power by use of a photoelectric-cell; it indicates the aim and focus of the beam; it affords the driver of the car a visual representation of the headlight condition; it is portable and may be readily rolled to the car anywhere in the garage or shop; it may be used in daylight or in darkness, a simple adjustment eliminating the effect of daylight on the light-sensitive cell; it requires but a few feet of space in front of the headlights undergoing test; and it may be quickly placed in correct position by a "gun-sight" and at the proper distance in front of the headlights by means of its optical range-finder.

To enable those acquainted with this art to understand the invention fully, both from functional and structural stand-points, a present preferred embodiment of the invention has been illustrated in the accompanying drawings, and for simplicity, like reference numerals have been employed to designate the same parts throughout the several views.

In these drawings:—

Figure 1 shows the headlight-tester in elevation in use in front of a headlight of a car;

Figure 2 is a front elevation of the appliance;

Figure 3 is a vertical section on an enlarged scale through a portion of the device showing the so-called "optoscope" in section;

Figure 4 is a plan view of the ground glass located in the upper portion of the optoscope; and Figure 5 is a plan view of the headlight-tester in front of an automobile.

Referring to these drawings, it will be observed that the device includes a triangular base-frame 11 mounted on caster-wheels 12, 12 so that it may be readily rolled into any desired position the rear of such base carrying an upright standard or column 13 to which are pivoted at 14, 14 two pairs of parallel links 15, 15, the front ends of which are pivoted at 16, 16 to a vertical frame 17 of any suitable construction and on which is fixedly mounted a pair of horizontal, vertically-spaced, hollow bars or guide-rails 18 and 19 desirably square or angular in cross-section.

As is clearly depicted in Figs. 2, 3 and 5, a horizontal elongated screen 21 with a vertical, front, light-reflective surface is mounted on the forward face of the frame 17 between the two bars or rails referred to, such screen on its active face, opposite the frame, carrying a horizontal or level gauge-line 22.

From what precedes, it will be clear that, since the column or standard 13 is rigidly mounted on the wheel-equipped base 11, and, since the four links 15, 15, as illustrated, are all of the same length affording a parallel-motion mounting for the frame 17 and its rails 18 and 19, the associated screen and the rails may be easily raised and lowered without otherwise changing their horizontal relation and their vertical arrangement, that is to say, the face of the screen is always in a vertical plane and the screen as a whole is arranged horizontally, all as is clearly and fully shown, this up and down adjustment permitting the appliance to be readily used with automobiles having headlights at different levels.

The so-called "optoscope" comprises an upright, vertically-elongated, sheet-metal casing or housing 23 open at both its top and bottom ends, such member being designed for support on, and for adjustment horizontally on, the companion rails 18 and 19, and, for this purpose, the upper portion of the optoscope shell 23 carries a bracket 24 resting on, and slidable on, the upper rail 18 and the lower part of the member 23 is fitted with a bracket 25 coacting with the lower rail 19, each such bracket having a bent end extended over the rear surface of the corresponding rail (Fig. 3).

By this simple means, the optoscope may be slid along the rails and is supported thereby in any desired position of adjustment.

In an aperture in its front wall and at the exact height of the horizontal or level line 22, the optoscope has a convex-lens 26, and, inside of its casing, it has a mirror 27 so positioned that it reflects the image projected on it by the lens onto a ground-glass 28 in the upper portion of the housing 23, such glass having crossed-lines 29 and 31, at right-angles to one another and intersecting at the center of the ground-glass (Fig. 4), one of these lines 29 being parallel to the screen 21.

Lens 26 is so positioned with respect to the ground-glass that the image of the head-lamp projected therethrough is reflected by the mirror 27 and focused sharply on the ground-glass when the optoscope is located at a given or predetermined distance from the lamp; in other words, when the lamp and ground-glass are located at the conjugate foci of the lens.

The image referred to is not a beam of light projected from the reflector of the lamp, but rather the illuminated face of the lamp considered as an object.

Mirror 27 is fixed at such an angle that when the optoscope is at such a height that the center of the lens 26 is at the same height as the center of the head-lamp, the middle point of the projected image of the headlamp coincides with the cross-line 29 of the ground-glass, and, if the optoscope be raised or lowered, the angular position remaining unchanged, the image will move across the face of the ground-glass, whereby it is possible to so position the optoscope vertically that the center of the projected image of the lamp coincides with the cross-line 29, and with all component parts arranged as above described, the center of the lens 26 will be at the same height as the headlight center and this arrangement makes it possible quickly and easily to adjust the optoscope so that the center of the lens is at the exact height of the headlamp center.

As is indicated in Figure 3, the lower part of the front wall of such housing or casing 23 is cut away or omitted at 32 and inside of this part of the casing is another inclined mirror 33 positioned to direct an image of the illuminated headlamp reaching it through a colored convex-lens 34, for example red, in an aperture in a horizontal partition 35 dividing the casing into upper and lower chambers, the lens being so located as to focus its colored image on the ground-glass 28.

The mirror 33 and the red lens 34 are so related as to produce the red image 52 on the ground-glass alongside the white image 51 formed by lens 26 (Fig. 4).

These lenses, mirrors and ground-glass constitute the range-finder of the apparatus.

A slide 36 vertically adjustable on the front of the optoscope and held in the needed position of elevation by friction, or otherwise, if preferred, carries a light shield or hood 37 open at 38 at the center portion only of its front end, the hood internally accommodating a photoelectric-cell 39 of ordinary commercial construction and in register with the opening 38, the cell being connected by electric-wiring 41 in the usual way to a micro-ammeter 42 at the top of the optoscope and which faces in the same general direction as does the photoelectric-cell.

On its front, the optoscope has a vertically-graduated scale 43 (Fig. 3) with its zero or starting or level point at the same height as the center of lens 26, which, of course, corresponds in height to the horizontal or level-gauge-line 22 on the screen 21, the graduations extending both up and down from such intermediate zero or level position, these marks desirably being such as to indicate inches drop or elevation in twenty-five feet, this being a scale commonly used by those engaged in the art of headlight adjustment, but of course other suitable units may be employed if preferred.

As is shown in Figure 2, the slide 36 which carries the photoelectric-cell is fitted with a pointer or index 44 coacting with the scale 43 in a manner well understood.

Also, on its front, the optoscope may have another vertical scale 45 with which a different pointer 46 on the slide 36 cooperates to show the distance of road-illumination by the headlight undergoing test.

Reverting now to the upright standard or vertical column 13, its top is supplied with a pair of sights 47 and 48, similar to and corresponding to, the rear and front sights respectively of a gun, in the present instance, sight 47 being a V-notch in a plate and sight 48 being a straight, vertical rod, wire, or the like, these sights, as is fully illustrated, being at exactly right-angles to the guide-rails 18 and 19 and to the screen 21.

In order to counterbalance the several cooperating members mounted on the supporting, parallel-motion links 15, 15, inclined, coiled, contractile springs 49, 49 are connected at their lower ends to the bottom links 15, 15 and at their top ends to the upper part of the standard.

This novel and improved tester is used substantially as follows, assuming that the automobile and tester are on a substantially-smooth level floor.

The tester having been positioned about ten feet in front of the car to undergo examination with its optoscope and screen toward the car and with the automobile-headlights turned off, the micro-ammeter needle is adjusted to zero position by a knob on the face of the dial and which forms a part of such commercial instruments, this adjustment eliminating the effect of daylight on the photoelectric-cell and meter, so that the entire subsequent readings represent the illumination of the headlights alone.

Thereupon, the automobile-headlights are turned on to produce their highest intensity and brightest light beams, the pattern of the beams being readily observable on the screen, most modern cars now changing from the high beam to passing lights by means of a foot-switch usually located at the left of the clutch-pedal.

Then the optoscope is shifted sidewise so as to be approximately straight in front of the headlight to be subjected to test and by looking in the open top of the optoscope two images of the headlight, one white and one red, 51 and 52 respectively, will be seen on the ground-glass.

Thereupon, the screen and optoscope are moved conjointly up or down until the white image 51 is centered on the horizontal line 29, that is, the one parallel to the screen 21.

This operation is readily and easily performed, since the exact center of the image will show on the ground-glass either as the bright spot of the bulb-filament or as a dark spot, if the lamp-filament is shielded.

Such adjustment assures that the center of lens 26 and the horizontal line 22 on the screen are both exactly at the same level as the center of the illuminated headlamp, but the operator does not yet know the exact distance between the tester and the headlamp.

Now the whole appliance is moved toward and from the car until the red image 52 is also centered on the same line 29, this adjustment of the position of the tester placing it at exactly ten feet in front of the headlamp and, as indicated above, the line 22 and lens 26 are precisely on the level of the headlamp.

In the use of this optical range-finder, it will be noted that the paths of the light rays issuing from the headlamp are indicated in Figure 1 of the drawings by the horizontal and inclined dot-and-dash lines, the horizontal ray passing through the lens 26 and being focused on the ground-glass 28 after being reflected by the associated mirror 27. The other mirror 33 being a substantial distance below lens 26, the light ray which reaches it must follow a downwardly sloping path, and the mirror is accurately set to the proper angle whereby to direct such ray of light through the colored lens 34 and to bring it to a focus on the ground-glass.

The manner in which this structure functions as a range-finder will be readily understood, because when the optoscope is at exactly ten feet in front of the headlamp the two dot-and-dash lines will intersect at the center of the face of such lamp, and, if the optoscope is at a greater or lesser distance in front of the lamp, the red image of the latter will not be centered on the ground-glass line 29.

Thus when the two images are on the specified line it is definitely known that the optoscope is precisely ten feet in front of the head-lamp.

Thereupon, the operator by means of his eye 53 (Fig. 5), the companion sights 47, 48, and the center-line 54 of the car-hood, or otherwise, lines up the tester squarely with the car, so that the screen and rails are sure to be at precisely right-angles to the length of the car.

For safety's sake, the screen may be again adjusted exactly for height as described above, and this insures that the line on the screen and the zero of scale 43 are at the same height above the floor as that of the headlamp center.

Without changing the position of the screen, the photoelectric-cell, its slide, shielding-hood, and pointers or indices 44 and 46 are shifted up or down, as a unit, on the face of the optoscope and the latter is slid along its supporting rails to the right and to the left until the point of greatest reading on the micro-ammeter is attained, which shows the point of highest light-intensity on the cell.

When this position of the cell is found, if the center of the white image 51 on the ground-glass coincides with the intersection of the two lines 29 and 31, then the operator knows from reading the position of the needle on the ammeter scale the intensity of candle power of the light beam, he learns that the beam is straight ahead, and, by reading the position of pointer 44 on scale 43, he is informed of the extent of drop or upward inclination of the light beam in inches per twenty-five feet.

If, however, the largest reading on the micro-ammeter occurs at some different location of the photoelectric-cell, and it is desired to have the beam straight ahead with a definite downward inclination, the operator slides the optoscope along until the center of the white image 51 is on line 31, it already being on line 29, and then he adjusts the photoelectric-cell up or down to give the desired reading on scale 43, whereupon he changes the direction or aim of the headlight until he again has the previous maximum ammeter reading.

This insures that the light beam of greatest intensity slopes downwardly straight ahead the required amount.

If, on the other hand, the correct light beam should be somewhat to the right or left, the photoelectric-cell is positioned to meet such condition, and, knowing what the greatest light intensity is from the lamp undergoing investigation, the lamp is adjusted to secure such ammeter reading on the definitely predetermined position of the light-sensitive cell.

Also, after this highest reading of the ammeter has been found and with the optoscope remaining in this position, the focus-adjusting screw of the lamp is turned slightly forward or backward to increase the reading of the meter if possible, and, of course, the point of greatest ammeter reading shows the correct focus of the lamp.

If desired, the ammeter may have a red mark indicative of the permissible minimum brilliance of the headlight.

At the same time, the pointer 44 indicates on its companion scale the elevation or drop of the light beam from such headlight in inches in twenty-five feet.

The pointer 46 shows on scale 45 the approximate distance of effective road illumination in feet.

An inspection of the drawings will show that when the pointer 44 is in register with the zero or "level" line of the scale 43, the center of the photoelectric-cell is somewhat below such position, this being due to the fact that it has been the practice for many years to aim the headlamps with respect to the top of the beam, that is to say, the top of the beam has been brought to the level of the headlamp center or so much below as requirements might indicate.

The principal reason for this has been that such aiming has been done on screens or with various types of headlight testers, visibly, by the operator looking at the beam and setting what he considered to be the top of the beam at the line on the screen.

However, the center of the high intensity portion of the beam is below the top of the beam but is a very indefinite thing to locate visually.

The photoelectric-cell, however, picks out or selects this center of high intensity quickly and accurately when used in conjunction with an ammeter which gives the highest reading, such greatest reading being an indication that the cell is at the point of brightest beam intensity.

Experimental work by headlight engineers has definitely established the fact that the so-called top of the high intensity portion of the light beam is one degree above the center of such high intensity portion, and hence the pointer or index 44 or 46 on the slide which carries the photoelectric-cell is placed one degree above the photoelectric-cell to enable the operator using the appliance still to be able to establish the location of the top of the beam.

Stated briefly, the photoelectric-cell is at the center of the highest beam intensity and the pointers indicate the top of the high intensity part of the beam.

In using the particular apparatus set forth above, the face of the photoelectric-cell is placed at a distance of ten feet from the headlamp, and at this distance one degree is represented by 2.1 inches, and, accordingly, the pointers on the scale are placed 2.1 inches above the center of such cell.

At the present time headlight experts are paying more attention to the center of such beam than formerly, but the present service station and garage practice is to work with the top of the beam rather than its center, and, in the present instance, in order to conform to such established procedure, the pointers are located as specified above, but it is to be understood that indices or pointers can be used with relation to the beam center should future practice tend in that direction.

The present invention is defined by the appended claims and it is to be understood that it is not limited to the precise and exact details of construction shown and described, but that more or less major changes may be incorporated in the structure without departure from the heart of the invention and without the loss or sacrifice of any of its material benefits.

I claim:

1. In an automobile headlight-tester, the combination of a support, a screen in a vertical plane adjustable up and down on said support while maintaining its vertical position, a level-line on said screen, an optical means adjustable horizontally on and vertically with said screen, said optical means having a first lens in its front wall with the center of said lens on the same height as said level-line, a first mirror in said optical means, a ground-glass in said optical means having lines thereon crossing at right-angles to one another and one parellel to said screen, said mirror being adapted to reflect an image of the automobile-headlamp projected thereon by said lens on said ground-glass, a second mirror in said optical means, a lens in said optical means adapted to project an image of the automobile-headlamp reflected thereto by said second mirror on said ground-glass at one side of the image reflected thereon by said first mirror, a photoelectric-cell vertically adjustable on said optical means, an indicator for said cell showing the strength of current produced thereby when the cell is subjected to light, a vertical scale on the headlight-tester, and a pointer movable with said cell and cooperating with said scale, the zero of said scale being at the same height as the center of said first lens.

2. The construction presented in claim 1 including means to make said images of different colors.

3. In an automobile headlight-tester, the combination of a support adapted to be placed in advance of the headlight to be tested, optical-means horizontally and vertically adjustable on said support and including a ground-glass, means to project an image of the headlamp undergoing test on said ground-glass, and means on said ground-glass cooperating with said headlamp-image to designate when the center of said projecting-means is at the same height as the center of said headlamp, a photoelectric-cell on and movable with said optical-means and also vertically adjustable on said optical-means, means including a scale to indicate the vertical position of said cell on said optical-means, and means to indicate the effect of the light from the illuminated headlamp on said cell.

4. The headlight-tester set forth in claim 3 in which said scale is on said optical-means and has its zero graduation at the same height as the center of said projecting-means.

5. In an automobile headlight-tester, the combination of a support adapted to be placed in advance of the headlight to be tested, optical-means horizontally and vertically adjustable on said support and including a ground-glass, means to project an image of the headlamp undergoing test on said ground-glass, and means on said ground-glass cooperating with said headlamp-image thereon to designate when the center of said projecting-means is laterally directly in front of the center of said headlamp, a photoelectric-cell on and movable with said optical-means and also vertically adjustable on said optical-means, means including a scale to indicate the vertical position of said cell on said optical-means, and means to indicate the effect of the light from the illuminated headlamp on said cell.

6. In an automobile headlight-tester, the combination of a support adapted to be placed in advance of the headlight to be tested, optical-means horizontally and vertically adjustable on said support and including a ground-glass, means to project an image of the headlamp undergoing test on said ground-glass, means on said ground-glass cooperating with said headlamp-image thereon to designate when the center of said projecting-means is at the same height as the center of said headlamp, and means on said ground-glass cooperating with said headlamp-image thereon to designate when the center of said projecting-means is laterally directly in front of the center of said headlamp, a photoelectric-cell on and movable with said optical-means and also vertically adjustable on said optical-means, means including a scale to indicate the vertical position of said cell on said optical-means, and means to indicate the effect of the light from the illuminated headlamp on said cell.

7. The headlight-tester set forth in claim 6 in which said scale is on said optical-means and has its zero graduation at the same height as the center of said projecting-means.

8. The automobile headlight-tester set forth in claim 6 in which said scale is on said optical-means and has its zero graduation at the same height as the center of said projecting-means and with graduations both below and above such zero.

9. The headlight-tester set forth in claim 3 in combination with a vertically-disposed screen on said support parallel to, and vertically adjustable with, said optical-means, and a horizontal-line on the surface of said screen facing said optical-means and at the same height as the center of said image-projecting means.

10. The headlight-tester set forth in claim 6 in combination with a screen on said support parallel to, and vertically adjustable with, said optical-means, and a horizontal-line on the surface of said screen facing said optical-means and at the same height as the center of said image-projecting means.

11. The headlight-tester set forth in claim 3 in combination with a sighting-means on the tester in a vertical plane at a right-angle to the horizontal adjustment movements of said optical-means.

12. The construction presented in claim 1 in combination with sighting-means on said support and in a vertical plane at right-angles to the plane of said screen and adapted to be lined up with parts of the automobile defining a longitudinal dimension of the automobile.

13. The headlight-tester set forth in claim 3 in which said optical-means includes means to project a second image of said headlamp on said ground-glass from a height different from that of said first projecting-means, and means cooperating with said second image to show when said photoelectric-cell is at a predetermined distance in front of said headlamp.

14. The headlight-tester set forth in claim 3 in which said optical-means includes means to project a second image of said headlamp on said ground-glass of a color different from that of said first image and from a height different from that of said first projecting-means, and means cooperating with said second image to show when said photoelectric-cell is at a predetermined distance in front of said headlamp.

15. The headlight-tester set forth in claim 6 in which said optical-means includes means to project a second image of said headlamp on said ground-glass from a height different from that of said first projecting-means, and means cooperating with said second image to show when said photoelectric-cell is at a predetermined distance in front of said headlamp.

16. The headlight-tester set forth in claim 6 in which said optical-means includes means to project a second image of said headlamp on said ground-glass of a color different from that of said first image and from a height different from that of said first projecting-means, and means cooperating with said second image to show when said photoelectric-cell is at a predetermined distance in front of said headlamp.

17. In an automobile headlight-tester, the combination of a support adapted to be positioned in advance of the headlight to be tested, a vertically-arranged screen having a light-reflective surface adapted to have the light-beam from the headlight played thereon and having a horizontal reference-line on said surface, means mounting said screen on said support for vertical adjustment thereon, a photoelectric-cell, means supporting said cell for vertical and horizontal adjustment over said surface of the screen, optical-means movable vertically with said screen to indicate when said reference-line is at the height of the center of the headlamp undergoing test, and means to indicate the effect of the headlight beam on said photoelectric cell.

18. The headlight-tester set forth in claim 17 in which said height-indicating optical-means is movable horizontally over said light-reflective surface of said screen, in combination with means to indicate when the vertical center line of said height-indicating optical-means is in the vertical plane through the headlamp center parallel to parts of the automobile defining a longitudinal dimension of the automobile.

ALBERT R. SQUYER.